United States Patent [19]

Hirschmann et al.

[11] 4,162,376
[45] Jul. 24, 1979

[54] CONFERENCE CALL CIRCUIT USING REVERSIBLE ANALOG TO DIGITAL CONVERTER

[75] Inventors: Peter Hirschmann, Puchheim; Ernst Höefer, Munich, both of Fed. Rep. of Germany

[73] Assignee: Siemens Aktiengesellschaft, Berlin & Munich, Fed. Rep. of Germany

[21] Appl. No.: 926,920

[22] Filed: Jul. 21, 1978

[30] Foreign Application Priority Data

Jul. 22, 1977 [DE] Fed. Rep. of Germany ....... 2733227

[51] Int. Cl.² ..................... H04M 3/00; H03K 13/02
[52] U.S. Cl. ............................ 179/18 BC; 179/1 CN; 340/347 C
[58] Field of Search .......... 179/18 BC, 15 AT, 1 CN; 340/347 C

[56] References Cited

U.S. PATENT DOCUMENTS

| 3,551,600 | 12/1970 | Berch | 179/18 BC |
| 3,828,146 | 8/1974 | Lewis | 179/18 BC |
| 3,971,891 | 7/1976 | Wolcott | 340/347 C |
| 4,056,820 | 11/1977 | Höfer | 340/347 C |

Primary Examiner—Charles D. Miller
Attorney, Agent, or Firm—Hill, Van Santen, Steadman, Chiara & Simpson

[57] ABSTRACT

A circuit arrangement is disclosed for individual subscribers in a telecommunication set up. The circuit arrangement converts analog signals into digital signals and digital signals into analog signals. When operated in a conference connection, summation signals are received by a subscriber which contain the subscriber's own share. Output digital signals from the subscriber are stored and converted into an analog value and are then subtracted from the received summation signal converted into an analog value.

4 Claims, 1 Drawing Figure

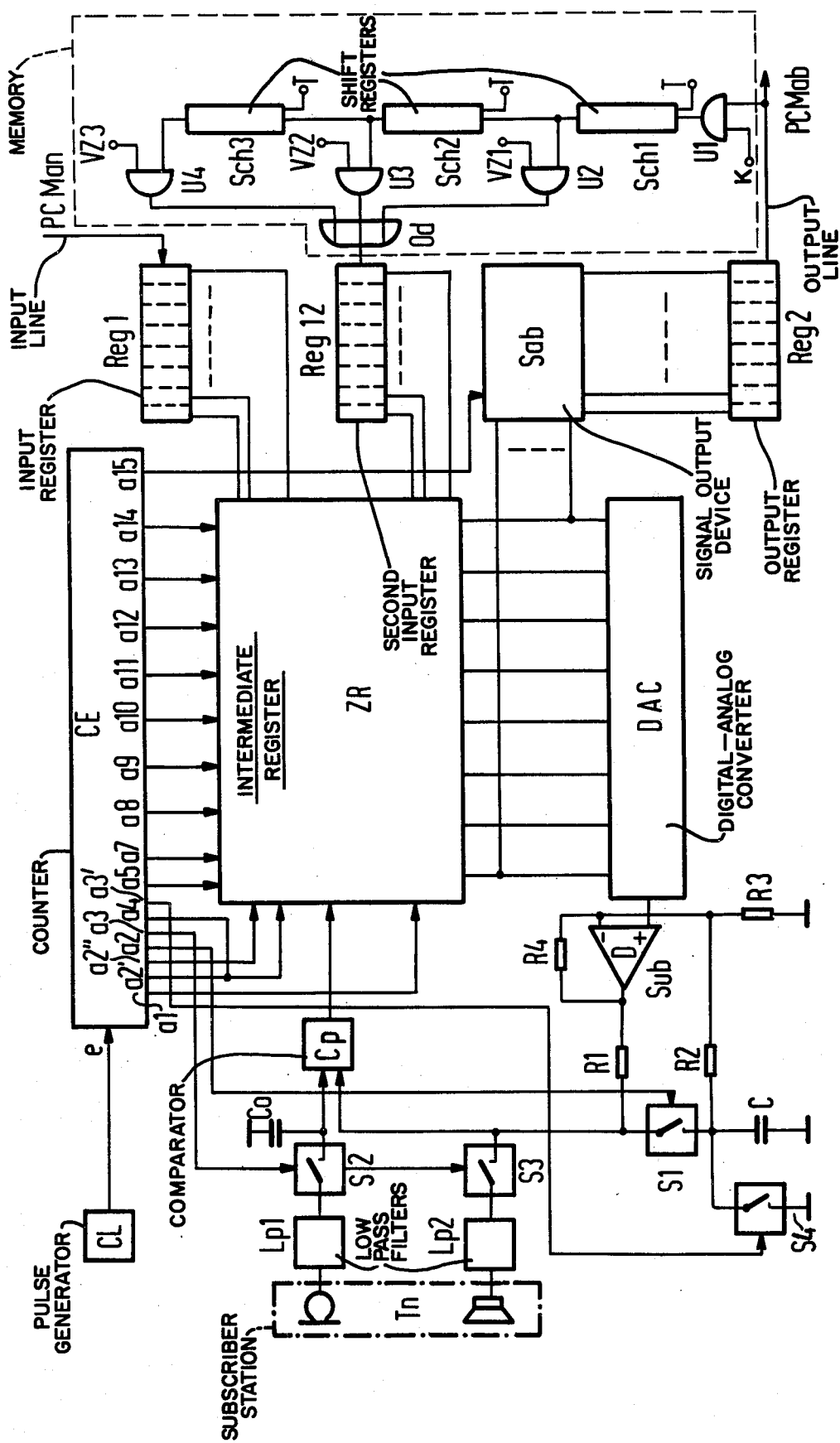

CONFERENCE CALL CIRCUIT USING REVERSIBLE ANALOG TO DIGITAL CONVERTER

BACKGROUND OF THE INVENTION

The invention relates to a circuit arrangement for converting analog signals, particularly PAM signals, into digital signals, particularly PCM signals, and for converting digital signals into analog signals for subscriber stations in a telecommunication setup. A transmitting device transmitting analog signals has an allocated signal output device providing digital signals which occur in pulse frames in cyclical repetition. A receiving device receives analog signals and has an allocated signal accommodation device accommodating digital signals. An analog-digital transducer operating in accordance with the iterative principle is provided comprising a counter, an intermediate register which can be controlled by the counter signals of said counter, a digital-analog converter connected at the outlet side of this intermediate register, and a comparator comparing the analog signals output by the digital-analog converter with the analog signals to be converted into digital signals. The counter controls the output of the counter positions to the intermediate register mentioned with the aid of its output signal and is designed such that it releases the transfer of a digital signal to be converted into an analog signal from an input register of the signal accommodation device to the digital-analog converter in specific counter positions. The counter effectively activates the inclusion of the digital-analog converter for the conversion of an analog signal into a digital signal in specific other counter positions. Additionally, the inputs of an output register of the signal output device are connected to the register stages of the intermediate register. Finally, the outputs of the input register are connected to the setting inputs of the register stages of the intermediate register in accordance with German patent application No. P 2,534,109 corresponding to U.S. Pat. No. 4,056,820 and incorporated herein by reference. Thus, the circuit arrangement in accordance with German patent application No. P 25 34 109 requires only one single analog-digital transducer per subscriber location. This transducer is twice utilized within each pulse frame or slot of the control impulses determining the respective subscriber station. The circuit arrangement is relatively inexpensive as to circuit technique since in addition to the analog-digital transducer which can be of conventional design, only one input register and one output register are required for the conversion of an analog signal into a digital signal and for the output of such a digital signal and also for the accommodation of a digital signal to be converted into an analog signal, and for the conversion of such a digital signal.

If the subscriber stations are a component of a telecommunication setup in which conference calls or connections can be produced between individual subscribers, summation signals are transmitted to the individual subscriber locations. These summation signals are composed of the individual signals of several conference subscribers and, in the case of digitally operating subscriber stations, as it is assumed here, there converted into analog signals.

These summation signals are formed at a central location or, if the subscriber stations are connected to a looped system, are formed at subscriber stations lying therein.

When a summation formation at a central location is developed such that the summation signal is composed of the individual signals of all subscribers taking part in the conference call, the conference set utilized for the summation formation requires less circuitry expense than if summation signals are transmitted to the individual conference subscribers. The summation signals respectively do not contain their own signal share of the receiving subscriber. For closed circuit systems it is natural that the incoming summation signal also contains the previously transmitted self signal share.

As this self signal share in the summation signal received is often perceived as disruptive, an elimination occurs in accordance with a known method (German Auslegeschrift No. 2,445,092) in that the self signal share is not only further transmitted, but is also stored and is subtracted from the summation signal received in the subsequent pulse frame or slot.

SUMMARY OF THE INVENTION

It is an object of the present invention to design the circuit arrangement in accordance with German patent application No. P 25 34 109 such that it is capable of providing the prerequisites for such a subtraction and also to carry out this subtraction. The components of this circuit arrangement are to be extensively utilized and only few additional components are necessary.

This objective is inventively resolved in a circuit arrangement in that the circuit arrangement is provided as a component of a telecommunication setup in which summation signals are formed from the individual signals of all conference subscriber stations and are transmitted to said stations in order to produce conference calls. A store is provided in which, in the case of an existing conference call, the digital signals located in the output register are stored simultaneously with their transfer from the subscriber station. The store has a storage time which can be adjusted to the processing time of a conference set used for the summation formation and is arranged at a central location and to the exchange. The circuit arrangement additionally has a second input register connected at the outlet side of the store and takes over the store content after the storage time expires. The input register is released to the digital-analog converter by the mentioned counter in order to release the first input register for the transfer of its content to the digital-analog converter. The input register, which is chronologically adjacent to the mentioned counter, also exhibits a subtraction device which forms a differential signal from the analog signals conveyed by the digital-analog converter on the basis of the transfer by means of the first and second input register. This subtraction device gives off the analog signals to the receiving device accommodating analog signals.

BRIEF DESCRIPTION OF THE DRAWING

The drawing shows a schematic block diagram of the invention.

DESCRIPTION OF THE PREFERRED EMBODIMENTS

The FIGURE schematically illustrates a subscriber station Tn having a transmitting device in the upper portion providing analog signals and having a receiving device in the lower position accommodating analog signals. This subscriber station is to be a component of a telecommunication setup in which summation signals are formed from the individual signals of all conference subscriber stations in order to produce conference calls. These summation signals are transmitted to the subscriber stations.

The subscriber station Tn mentioned is connected with its transmitting device to a capacitor Co via a low pass filter Lp1 and a switch S2. One input of a comparator Cp, which is an analog comparator, is connected to this capacitor.

A counter Ct is an additional component of the circuit arrangement illustrated, and is a 1 to n counter. This counter is directly connected to a pulse generator CL at a counter input e.

The counter Ct, among other things, supplies actuation signals for an intermediate register ZR, not more precisely illustrated here. This register exhibits 8 register stages in the form of flip-flops in accordance with the given 8 bit per PCM word. From an input register Reg1 which is a component of the signal accommodation device for digital signals incoming on the incoming line PCMan, the intermediate register can take over such signals in its intermediate register stages. The intermediate register can output these digital signals to a digital analog converter DAC connected with its inputs to the outputs of the register stages.

An output register Reg2 is an additional component of the circuit arrangement illustrated. This output register is a component of a signal output device Sab which can also take over digital signals in the form of PCM words from the register stages of the intermediate register ZR. The outgoing line PCMab is connected to the serial output of the output register.

The circuit arrangement described thus far corresponds with the circuit arrangement of German patent application No. 2534109 incorporated herein by reference.

Additionally, the circuit arrangement illustrated has a memory which is in this case a cycling memory consisting of three shift registers SCH1 through SCH3 connected in series. The input of the first shift register SCH1 is connected to the output of an AND element U1 whose one input is connected to the outgoing line PCMab and to whose other input a release signal K can be connected which is then present when this existing connection is a conference connection or call. The outputs of shift registers SCH1 through SCH3 are respectively connected to the input of another of the AND elements U2 through U4. Release signals VZ1, VZ2 and VZ3 can respectively be connected to the other inputs of the AND elements. The outputs of the AND elements U2 through U4 are combined by an OR element Od.

The duration of the shift registers SCH1 through SCH3, in accordance with the applied shift pulse T, depends upon what storage times are to be obtained. The number of shift registers SCH1 through SCH3 which become consecutively effective depends upon the release of the AND elements U2 through U4. The storage times, which can be adjusted in this manner, correspond with the processing times for the formation of a summation signal at a central location from the individual signals of additional conference subscribers, in the present example 1, 2 or 3, including the processing time of the exchange.

A second input register Reg12 is an additional component of the circuit arrangement illustrated. A series input of Reg12 is connected to the output of the OR element Od and its parallel outputs (not illustrated) are conveyed to the register stages of the intermediate register ZR, precisely as in the case of the first input register Reg1.

Finally, the circuit arrangement illustrated exhibits a subtraction device Sub in the form of a differential amplifier D.

The non-inverting input of this differential amplifier is connected to the output of the digital-analog converter DAC. The output of the differential amplifier is connected to a first terminal of a capacitor C via an impedance R1 and via a switch S1. The other terminal of the capacitor is applied to ground. A connection between the first terminal of capacitor C and the inverting input of the differential amplifier is provided by an impedance R2. This input of differential amplifier D is also connected to the output of the differential amplifier D via impedance R4 and is, moreover, applied to ground via impedance R3.

The terminal of impedance R1 away from the output of the differential amplifier is connected to the second input of comparator Cp and can, moreover, be connected to the low pass filter Lp2 via a switch S3. This low pass filter connects to the receiving device of subscriber station Tn which accommodates analog signals.

The mode of operation of the circuit arrangement is subsequently described for the case of a conference call.

In that case, a release signal is continuously connected to input K of AND element U1. Assuming that three additional subscriber stations take part in the conference connection or call in addition to the subscriber station Tn reviewed, a permanent signal is also connected to the release input VZ3 of the AND element U4 with the result that all three of the shift registers SCH1 through SCH3 are effective for the signals provided by AND element U1. Therefore, the processing time for the formation of the summation signal of the four conference subscribers is taken into consideration.

The pulse sequence frequency of the timing pulses given off by pulse generator CL and the design of the counter Ct are selected such that during operation, counter output signals occur at the individual counter outputs respectively in a specific period. This period is identical with the period in which digital signals occur on lines PCMan and PCMab of the telecommunication system. This period can have a duration of 125 $\mu$s, for example. This value corresponds with the pulse frame duration in conventional PCM time multiplex telecommunication exchange systems.

It is now first assumed that an analog signal is output by the subscriber station Tn. This analog signal is converted into a digital signal which is to be output via signal output device Sab, the output register Reg2, and the outgoing line PCMab.

Assuming that the counter Ct has just been in its output position in which no counter output signal is sent by any of its outputs, the counter signals reaching the input e from pulse generator CL now consecutively cause the appearance of counter output signals at the outputs a1 through a15.

With the occurrence of a counter output signal at the output a3, the switch S2 is closed so that the analog signal sent by the transmitting device of subscriber station Tn can now reach capacitor Co via low pass filter Lp1. A voltage corresponding with the instantaneous amplitude of the respective analog signal is now present on capacitor Co and therefore a PAM signal is present.

The register stages of the intermediate register are erased when a counter output signal appears at output a4. Moreover, switch S2 is again opened. By means of the subsequent counter output signals appearing at the counter outputs a5 through a14, the register stages of the intermediate register are consecutively influenced on the one hand directly, and are influenced on the other hand by the release of influence by the output signals of comparator Cp. Accordingly, the analog output signal which the digital analog converter DAC connected to the register stages supplies to comparator Cp is gradually adjusted to the amplitude of the analog signal to be converted and stored in capacitor Co. This conversion process is also called an iterative process and is basically known (see, for example, German Offenlegungsschrift No. 2,315,986, FIG. 1; U.S. Patent No. 3,234,544; German Offenlegungsschrift No. 2,534,109) all incorporated herein by reference. This process is not further explained here. With the appearance of the last counter output signal at output a15, the information of the register stages of the intermediate register ZR is transferred to the output register Reg2 by means of signal output circuit Sab from where it is further transmitted via the outgoing line PCMab. In a manner not illustrated, this information arrives, for example, at a conference set arranged in the exchange where it contributes to the formation of a summation signal together with digital signals incoming from the other conference subscribers. The digital signal output by register Reg2 of the subscriber station Tn, however, also arrives at a store via the AND element U1. This store is formed by shift registers SCH1 through SCH3 in the operational case considered. The digital signal then reaches the second input register Reg12 of the circuit arrangement illustrated via the AND element U4 and the OR element Od after passing through these shift registers. The storage time of the shift register comprising the shift registers SCH1 through SCH3 is, as mentioned, adjusted to the processing time during the summation formation by means of the conference set so that at the time of the transfer to the second input register Reg12, such a digital summation signal to which the digital signal present in register Reg12 has contributed has already reached the first input register Reg1 from the central location.

With the beginning of the next counting cycle of counter Ct an erasure of the register content of the intermediate register ZR proceeds by means of the counter output signal at output a1. A transfer of the digital signal present in the second input register Reg12 to the intermediate register ZR occurs when an output signal appears at output a2', and thus a conversion into an analog signal occurs by means of the digital-analog converter DAC. This analog signal reaches capacitor C with a subsequent appearance of a counter output signal at counter output a2" by means of which switch S1 is closed. The counter outputs a2' and a2" do not give off any signals in the case of a single call or connection.

With the subsequent appearance of a counter output signal at counter output a2, the switch S1 is again opened and the transfer of the digital signal located in the first input register Reg1 to the intermediate register ZR now occurs. This digital signal represents the summation signal.

When a counter output signal appears at the counter output a3, switches S2 and S3 are closed.

The individual analog signal connected to the inverting input of the differential amplifier via impedance R2 and stored in capacitor C is subtracted from the analog summation signal still output at that point in time by the output of digital-analog converter DAC. This summation signal is connected to the non-inverting input of the differential amplifier D. The resulting signal then arrives at the receiving device of the subscriber station Tn which accommodates the analog signals via the closed switch S3 and low pass Lp2. Thus, an analog signal has been conveyed to this receiving device which, as desired, only contains the shares of the three remaining conference subscribers.

With the occurrence of a counter output signal at the counter output a3', capacitor C is discharged via switch S4.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A telecommunication circuit arrangement for converting PAM (Pulse Amplitude Modulated) analog signals into PCM (Pulse Code Modulated) digital signals and for converting digital signals into analog signals for subscriber stations of a telecommunication setup, comprising:

(a) transmitting means providing an analog signal to be converted to a digital signal, said transmitting means having an allocated signal ouput means providing a digital signal which occurs in pulse frames in cyclical repetition;

(b) a receiving means accepting analog signals, said receiving means having an allocated signal acceptance means accepting a digital signal;

(c) an analog-digital transducer means operating in iterative fashion, said analog-digital transducer means comprising a counter means, an intermediate register controlled by actuating signals of said counter means, a digital-analog converter connected at an output side of said intermediate register, and a comparator means comparing analog signals output by the digital-analog converter with the analog signal to be converted into a digital signal, said counter means providing actuating signals to the intermediate register;

(d) said signal acceptance means having an input register and said counter means providing actuating signals to the input register to transfer the digital signal to be converted into an analog signal from the input register to the digital-analog converter;

(e) said counter means providing actuating signals to actuate the digital-analog converter for conversion of an analog signal into a digital signal;

(f) said allocated signal output means having an output register whose inputs are connected to register stages of the intermediate register, outputs of the output register being connected to setting inputs of the register stages of the intermediate register;

(g) an input line having summation signals formed from individual signals of all conference subscriber stations and which are transmitted to said stations in order to produce conference connections;

(h) memory means in which, in the case of an existing conference connection, the digital signal located in said output register is stored simultaneously with its transfer from the output register, said memory means having a storage time which can be adjusted to a processing time of the summation signals;

(i) a second input register means connected at an output of said memory means for taking over memory information after the storage time is expired; and (j) subracting means connected to the digital-analog converter for receiving an analog summation signal and subtracting an analog signal corresponding to the digital signal received by the second input register means, a resulting analog signal being output by the subtracting means to the analog receiving means.

2. A circuit arrangement in accordance with claim 1 in which said subtraction means comprises a differential amplifier having a non-inverting input connected to the output of the digital-analog converter and an output connected to an intermediate store via a first switch means which closes to place the digital signal in the second input register means after conversion into an analog signal into the intermediate store, said intermediate store also being connected to an inverting input of the differential amplifier, and the output of the differential amplifier being connected to the receiving means via a second switch means which closes when outputting the resulting analog signal to the receiving means.

3. A method for operating a telecommunication subscriber station connected to an input line and an output line connecting to other subscriber stations with which conference connections can be maintained by the formation of summation signals, comprising the steps of:

(a) creating a transmitted analog signal in the subscriber station and converting the analog signal to a transmitted digital signal through iteration with an analog-digital transducer means comprising an intermediate register, digital-analog converter, a first store, and a comparator;

(b) outputting the transmitted digital signal to the output line;

(c) storing the transmitted digital signal in a memory and then feeding the stored transmitted digital signal back through the intermediate register and digital-analog converter to a second store to form a stored transmitted analog signal.

(d) receiving a digital summation signal from the input line containing the transmitted digital signal of the subscriber station together with transmitted digital signals from the other subscriber stations;

(e) feeding the digital summation signal through the intermediate register and digital-analog converter to create an analog summation signal; and (f) subtracting said stored transmitted analog signal from said digital summation signal and outputting the resulting analog signal as a received analog signal in the subscriber station;

whereby interference in the received analog signal caused by the subscriber station's own transmitted analog signal during a conference connection with other subscriber stations is substantially eliminated.

4. A method for operating a telecommunication subscriber station connected to an input line and an output line connecting to other subscriber stations with which conference connections can be maintained by the formation of summation signals, comprising the steps of:

(a) creating a transmitted analog signal in the subscriber station and converting the analog signal to a transmitted digital signal which is placed on the output line;

(b) storing the transmitted digital signal and then later converting the stored transmitted digital signal to a stored transmitted analog signal;

(c) receiving a digital summation signal from the input line containing the transmitted digital signal of the subscriber station together with transmitted digital signals from the other subscriber stations; and (d) converting the digital summation signal to an analog summation signal and subtracting the stored transmitted analog signal to create a resulting analog received signal for the subscriber station.

* * * * *